Patented May 13, 1952

2,596,935

UNITED STATES PATENT OFFICE 2,596,935

NITROGEN-PHOSPHORUS COMPOSITION AND PROCESS FOR SAME

John E. Malowan and Forrest R. Hurley, Dayton, Ohio, assignors to Monsanto Chemical Company, St. Louis, Mo., a corporation of Delaware No Drawing. Application December 30, 1948, Serial No. 68,402

5 Claims. (Cl. 23—14)

This invention relates to a composition of matter containing principally nitrogen and phosphorus in combined form.

An object of the present invention is to provide a product containing combined nitrogen and phosphorus in a substantially water-insoluble form. A further object is the provision of a process for producing compositions of matter containing combined nitrogen and phorsphorus in a form which has a substantially neutral reaction.

In the prior art, the products which are referred to in the literature as imidodiphosphoric acids have been prepared by the reaction between ammonia or ammonium carbamate and phosphorus oxychloride. The reaction has been carried out by treating $POCl_3$ with ammonia or ammonium carbamate at ordinary or at elevated temperatures. It has also been carried out by first dissolving the phosphorus oxychloride in benzene and then treating the solution with ammonium carbamate. Many of the compositions described in the literature contain varying amounts of combined chlorine which is difficult to eliminate from the product.

When the prior art products are prepared by the methods described in the literature the aqueous solutions of the products show an acid reaction. Such compositions are, therefore, often unacceptable for technical uses, since, for most purposes, it is desirable to have a material which has at the most a neutral and may even have a somewhat alkaline reaction.

We have now found that if we carry out the reaction between phosphorus oxychloride and ammonia under conditions where the phosphorus oxychloride is dissolved in an inert solvent having a normal boiling point above 100° C., that an apparently new product is formed which has a nitrogen to phosphorus atomic ratio above 1.50 and which may be provided to impart an alkaline or substantially neutral reaction to its aqueous suspension.

The inert solvent which we employ in our process is preferably a hydrocarbon, and desirably an aliphatic hydrocarbon, such as kerosene, gas oil, mineral oil, or lubricating oil, although any inert liquid solvent not reactive with either phosphorus oxychloride or ammonia and having a boiling point above 100° C. may be used. A preferred group of solvents have boiling ranges over 200° C., particularly if atmospheric pressure operation is followed.

The process is most conveniently carried out by passing gaseous ammonia into a solution of phosphorus oxychloride (also called phosphoryl chloride) dissolved in a hydrocarbon solvent boiling above 200° C. until at least 5 moles of ammonia per mole of phosphorus oxychloride have been added and combined therewith. It has been found that a definite compound is formed at this stage, although more ammonia may be added. The reaction is best carried out at temperatures below 100° C. and preferably above 20° C., utilizing normal pressure or elevated pressure. Since exothermic reaction heat is liberated it is desirable to cool the hydrocarbon solution during the reaction in order to maintain the temperature thereof between the above limits. The product formed by this initial reaction is a fine, white powder which consists of a mixture of a nitrogen-phosphorus containing body and ammonium chloride. The nitrogen-phosphorus containing body is at this stage water-soluble and alkaline in reaction. If desired, the reaction product may now be separated by filtration or by centrifuging from the hydrocarbon and the separated product treated according to the second step of our process.

Preferably the heating step may be carried out upon the reaction product produced by the first step while the product is still suspended or mixed with the original hydrocarbon solvent. This results in better yields and simplified operation, since the material may be handled more easily and without losses. The second step of our process involves heating the product produced in the first step to a temperature above 155° C., but below a temperature of 250° C., either at atmospheric or superatmospheric pressure. During the heating period, a small amount of ammonia is evolved which may be recovered and reused in the process. During the heating step the nitrogen-phosphorus product apparently undergoes a polymerization or molecular rearrangement, being converted thereby into a water-insoluble product of higher molecular weight.

At the conclusion of the heating step the product or the fluid containing the product is cooled, and, if fluid is still present, this is separated by filtration or by centrifuging. The product is now leached with water for the purpose of removing the ammonium chloride which is present in the initial reaction product. The nitrogen-phosphorus containing condensation product, being substantially insoluble and practically free of chlorine, remains behind as the desired product of the process. It has been found that during the leaching or washing step, the alkalinity of the product, as measured in an aqueous suspension, increases in magnitude beyond a pH value of 6.5 to neutrality and/or even to the point of exhibiting an alkaline reaction in the pH range of 7.0 to 7.5.

The product so obtained may be used for various purposes. Since it is substantially insoluble in water, it may be employed as a fertilizer for supplying nitrogen and phosphorus in slowly available form to growing vegetation. It may also be employed as a fireproofing or glowproofing material as described and claimed in applications, Serial No. 68,403, filed December 30, 1948; Serial No. 68,404, filed December 30, 1948; Serial No. 68,405, filed December 30, 1948; Serial No. 68,406, filed December 30, 1948; Serial No. 68,407, filed December 30, 1948; Serial No. 68,408, filed December 30, 1948; Serial No. 68,409, filed December 30, 1948; Serial No. 68,410, filed December 30, 1948; Serial No. 68,411, filed December 30, 1948; Serial No. 136,135, filed December 30, 1949; Serial No. 136,136, filed December 30, 1949; which applications are assigned to the same assignee as is the present case.

The following examples illustrate the present invention, but are not limitative as to the scope of the invention.

Example 1

One hundred parts of phosphoryl chloride was dissolved in 300 parts of kerosene of commercial grade. The kerosene had a boiling range of about 150° to 260° C. Anhydrous ammonia gas was then passed into the kerosene solution at a slow rate of addition, and simultaneously therewith, the solution was cooled in order to maintain the temperature below about 80° C. At the same time, efficient agitation of the solution was maintained. The addition of ammonia was continued in this manner until 5 moles of ammonia had been reacted with the phosphoryl chloride. The reaction product was insoluble in kerosene and appeared as a white powder suspended therein.

After completion of the ammonia addition, the reaction mixture, while remaining suspended in kerosene, was heated to a temperature of 200° C. After the temperature had reached 200° C., heating was discontinued and the mixture permitted to cool. During the heating period, some ammonia was evolved, the nitrogen-phosphorus product apparently undergoing polymerization and becoming water-insoluble. At the end of the heating period, which may be carried out for a period of from one-fourth to three hours, preferably one to three hours, the solids were removed from the kerosene by filtration or centrifuging. The product was next washed with water in sufficient amount so as to dissolve the ammonium chloride present in the product. The washing operation may also be followed by a heating step which is designed to dry the product and also to remove traces of the kerosene or other hydrocarbon. A convenient method for removing the hydrocarbon consists in steaming the product while it is contained in a rotating centrifuge.

The nitrogen-phosphorus containing product, resulting from the present process, is substantially insoluble in water as well as organic solvents. It may be suspended or dispersed in water and will then exhibit a pH which is substantially neutral or alkaline in reaction. The final product is free from chlorine as a result of the heating and polymerization step, which makes it possible for the ammonium chloride to be completely removed to leave only the condensation product consisting essentially of nitrogen, oxygen, hydrogen and phosphorus. The nitrogen-phosphorus atomic ratio is approximately 1.80:1, but may be varied within the range of 1.5:1 to 2.0:1 by variation of the amount of $NH_3$ initially reacted with the $POCl_3$, and this product to some degree polymerized, and then subjected to heating as described above, to complete the polymerization. The preferred N:P ratio suitable for most purposes varies from 1.70:1 to 1.95:1.

Example 2

Five hundred grams of phosphoryl chloride dissolved in 4.308 grams of kerosene was treated with gaseous ammonia until the weight gain amounted to 277 grams. During this operation, the temperature of the mass was kept below 65° C. by cooling means. At the conclusion of ammonia addition, the reaction mass, in the presence of the kerosene, was heated to 200° C. for 2.5 hours. During this time, approximately 17 grams of ammonia was evolved. The kerosene was removed by filtration and the nitrogen-phosphorus composition so recovered was washed with water to free it of ammonium chloride, after which the product was air dried at 60° C. The product amounted to 242 grams of the nitrogen-phosphorus composition.

Example 3

A 5-liter flask, equipped with an efficient stirrer, was charged with 2,952 grams of a refined petroleum hydrocarbon fraction of the type commonly employed as an insecticide base, and having a boiling range of about 200° to 250° C. This was used as the solvent for 401 grams of phosphoryl chloride, and into this solution, ammonia gas was passed until the increase in weight of the reaction product totaled 235 grams. The temperature was kept in the range of 70° to 80° C. by cooling means, and the solution was agitated throughout the addition period.

The white product appearing as an insoluble suspension in the hydrocarbon was found to be water-soluble. The reaction mixture of the primary product was retained in the same carrier liquid and was then raised in temperature to 200° C. over a period of one and one-half hours. The product was then cooled and the insoluble polyphosphorylamide was removed by filtering. The dry product was then washed with water to remove ammonium chloride to yield a product consisting of polyphosphorylamide which analyzed: N, 30.66%; P, 36.54%, so that the nitrogen-phosphorus ratio was 1.86. The weight of the final product was 204 grams, representing a substantially quantitative conversion of the initial phosphorus into the final product.

The process may also be carried out by the use of liquid ammonia which may be added directly to the reaction mixture. The evaporation of the liquid ammonia removes some heat from the solution, thereby serving also to aid in the cooling necessary to keep the temperature within the desired limits.

In view of the complexity of the nitrogen-phosphorus compounds, produced by this process, the exact molecular arrangement of the present product has thus far been impossible of ascertainment. Accordingly, we do not wish to be bound by any theory concerning the constitution of the same or the reaction mechanism by which it is formed. It appears possible, however, that one form of our product may consist of a molecular structure which may be written as follows:

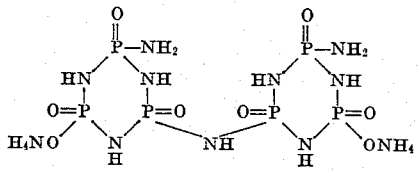

The product of the invention herein designated as polyphosphorylamide is a condensation product containing phosphorus, oxygen, hydrogen and nitrogen in a polymerized form representing a high molecular weight compound. It would appear that cyclic compounds are formed in the polymerization step to obtain alternating phosphorus and nitrogen members in cyclic arrangement probably in the form of six-membered rings, although eight-membered and also ten- and twelve-membered cyclic units may also be present. In addition to such nuclear nitrogen, the additional nitrogen of amido groups linked to the ring, together with ammonium groups ($NH_4O-$) may also be present as the result of the reaction with water. Less than 25% of the total nitrogen is present as ammonia nitrogen, as determined by reaction with dilute aqueous caustic solution. A preferred range is 20% to 25% of the total nitrogen existing as ammonia nitrogen. The thermal treatment may also result in the consolidation by condensation of the rings such as by the elimination of ammonia from the amido groups with the result that imido bridges may be formed linking the cyclic structures as represented above. It would appear that the polymerization proceeds to form two such rings as a condensed unit, although further condensation is possible to obtain structural formulas containing three to six and even eight, ten, or twelve such cyclic units. As a result of the condensation described above, the resulting product may be characterized as a compound of phosphorus, nitrogen, hydrogen, and oxygen, in which phosphorus may be present in from 32% to 43% by weight, nitrogen may be present in from 25% to 33%, and the remainder comprises hydrogen and oxygen, arranged in accordance with the molecular configurations discussed above. Preferred ranges of the said compositions have been found to be obtainable when the phosphorus content is from 34% to 39%, and the nitrogen content lies in the region of 27% to 31%.

The polyphosphorylamide is insoluble in water and organic solvents. The material does not hydrolyze in contact with water at room temperature.

Having thus described particular embodiments of our invention, we wish it to be understood that the invention is not to be limited to the particular processes and compositions herein described or specifically covered by our claims.

What we claim and desire to secure by Letters Patent of the United States is:

1. The process for preparing a nitrogen-phosphorus containing product which comprises reacting anhydrous ammonia with phosphoryl chloride dissolved in a hydrocarbon solvent having a boiling point above 200° C. until at least 5 moles of ammonia per mole of phosphoryl chloride have been combined and then heating the reaction product in said solvent to a temperature above 155° C. but below 250° C., dissolving ammonium chloride present in the reaction product by leaching with water and then drying the said nitrogen-phosphorus containing product.

2. The method of producing a nitrogen-phosphorus complex which comprises reacting about 5 moles of anhydrous ammonia with one mole of phosphoryl chloride at a temperature in the range of 20° C. to 100° C. in an inert liquid dispersing medium having a normal boiling point greater than 100° C. for a sufficient period of time to obtain a water-soluble product, and thereafter heating the said water-soluble product in the said medium to a temperature in the range of 150° C. to 200° C. for a sufficient period of time to effect a molecular condensation with loss of ammonia from the product, thereby forming a water-insoluble product in which the atomic ratio of nitrogen to phosphorus is greater than 1.5:1 and less than 2.0:1.

3. The water-insoluble product obtained by the process of claim 2.

4. The method of producing a nitrogen-phosphorus complex which comprises reacting about 5 moles of anhydrous ammonia with one mole of phosphoryl chloride at a temperature in the range of 20° C. to 100° C. in an inert liquid dispersing medium having a normal boiling point greater than 100° C. for a sufficient period of time to obtain a water-soluble product, and thereafter heating the said water-soluble product in the said medium to a temperature in the range of 180° C. to 200° C. for a period of about 1 to 3 hours to effect a molecular condensation with loss of ammonia from the product, thereby forming a water-insoluble product in which the atomic ratio of nitrogen to phosphorus is greater than 1.5:1 and less than 2.0:1.

5. The water-insoluble product obtained by the process of claim 4.

JOHN E. MALOWAN.
FORREST R. HURLEY.

REFERENCES CITED

The following references are of record in the file of this patent:

UNITED STATES PATENTS

| Number | Name | Date |
|---|---|---|
| 2,122,122 | Woodstock | June 28, 1938 |

OTHER REFERENCES

Mellor, "Comprehensive Treatise on Inorganic and Theoretical Chemistry," vol. 8 (1928), pages 704 to 720.

Gladstone, Journal Chemical Society, vol. 7 (1869), pages 16–19.